United States Patent
Poffet et al.

(10) Patent No.: US 9,533,438 B2
(45) Date of Patent: Jan. 3, 2017

(54) METHOD OF FORMING A TRANSPARENT ONE PIECE TIMEPIECE COMPONENT

(71) Applicant: ETA SA MANUFACTURE HORLOGERE SUISSE, Grenchen (CH)

(72) Inventors: Christian Poffet, Giffers (CH); Philipp Gaechter, Itingen (CH); Xavier Tinguely, Fontaines (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 477 days.

(21) Appl. No.: 14/349,948

(22) PCT Filed: Oct. 2, 2012

(86) PCT No.: PCT/EP2012/069473
§ 371 (c)(1),
(2) Date: Apr. 4, 2014

(87) PCT Pub. No.: WO2013/050374
PCT Pub. Date: Apr. 11, 2013

(65) Prior Publication Data
US 2014/0319741 A1    Oct. 30, 2014

(30) Foreign Application Priority Data
Oct. 4, 2011    (EP) ..................................... 11183805

(51) Int. Cl.
*B29C 45/00* (2006.01)
*B29C 33/50* (2006.01)
(Continued)

(52) U.S. Cl.
CPC ........... *B29C 45/0001* (2013.01); *B29C 33/50* (2013.01); *B29C 45/26* (2013.01); *G04B 3/04* (2013.01);
(Continued)

(58) Field of Classification Search
None
See application file for complete search history.

(56) References Cited

U.S. PATENT DOCUMENTS 4,923,672 A    5/1990  Gladden et al.
9,321,226 B2 *  4/2016  Poffet ................. B29C 45/1679
(Continued)

FOREIGN PATENT DOCUMENTS

CH    369407      5/1963
EP    0 320 811   6/1989
(Continued)

OTHER PUBLICATIONS

Sven Schrobel et al., Scratch-Resistance in One Step, Kunststoffe international, Jan. 2010, pp. 52-55.*
(Continued)

*Primary Examiner* — Benjamin Schiffman
(74) *Attorney, Agent, or Firm* — Oblon, McClelland, Maier & Neustadt, L.L.P.

(57) ABSTRACT

Method for forming a transparent timepiece component including top and bottom surfaces:
  a transparent polymerizable material is chosen;
  there is applied to a plate a flexible female mold including a capillary network and having a contact surface which is the negative of the bottom surface, bordered by an edge;
  a cavity is delimited by the sealed juxtaposition of the edge with a plate having a contact surface which is the negative of the top surface;
  the material is injected through the capillary network to fill the cavity;
  the material is polymerized to obtain a rigid component;
  the component is removed from the plates by the deformation of this flexible mold.

(Continued)

Hardness is improved by the UV exposition of this component.

10 Claims, 2 Drawing Sheets

(51) Int. Cl.
| | |
|---|---|
| *G04B 29/02* | (2006.01) |
| *G04B 3/04* | (2006.01) |
| *G04B 5/16* | (2006.01) |
| *G04B 15/14* | (2006.01) |
| *G04B 39/00* | (2006.01) |
| *G04B 45/00* | (2006.01) |
| *B29C 45/26* | (2006.01) |
| *B29C 45/34* | (2006.01) |
| *B29K 33/00* | (2006.01) |
| *B29K 77/00* | (2006.01) |
| *B29L 31/00* | (2006.01) |

(52) U.S. Cl.
CPC ............... *G04B 5/16* (2013.01); *G04B 15/14* (2013.01); *G04B 29/027* (2013.01); *G04B 39/006* (2013.01); *G04B 45/0076* (2013.01); *B29C 45/34* (2013.01); *B29C 2045/2695* (2013.01); *B29K 2033/08* (2013.01); *B29K 2033/12* (2013.01); *B29K 2077/00* (2013.01); *B29L 2031/739* (2013.01)

(56) References Cited

U.S. PATENT DOCUMENTS

| | | | |
|---|---|---|---|
| 2004/0241049 A1 | 12/2004 | Carvalho | |
| 2009/0224433 A1 | 9/2009 | Kurihara et al. | |
| 2010/0062272 A1* | 3/2010 | Wursche | B32B 27/34 |
| | | | 428/473.5 |
| 2010/0167045 A1* | 7/2010 | Schultes | B29C 45/1679 |
| | | | 428/335 |
| 2011/0045269 A1* | 2/2011 | Wursche | B32B 27/34 |
| | | | 428/220 |
| 2011/0163481 A1 | 7/2011 | Kurihara et al. | |
| 2012/0296004 A1* | 11/2012 | Schultes | B29C 45/1679 |
| | | | 522/183 |
| 2013/0129980 A1* | 5/2013 | Meinhard | C08J 7/047 |
| | | | 428/152 |
| 2014/0242273 A1* | 8/2014 | Poffet | B29C 45/1679 |
| | | | 427/164 |

FOREIGN PATENT DOCUMENTS

| | | |
|---|---|---|
| EP | 0 549 978 | 7/1993 |
| EP | 1 950 021 | 7/2008 |
| JP | 58 80587 | 5/1983 |
| WO | 2012 025291 | 3/2012 |

OTHER PUBLICATIONS

International Search Report Issued Jan. 3, 2013 in PCT/EP12/069473 Filed Oct. 2, 2012.

* cited by examiner

METHOD OF FORMING A TRANSPARENT ONE PIECE TIMEPIECE COMPONENT

This is a National phase application in the United States of International Patent Application PCT/EP2012/069473 filed Oct. 2, 2012 which claims priority on European Patent Application No. 11183805.8 filed Oct. 4, 2011. The entire disclosure of the above patent application are hereby incorporated by reference.

FIELD OF THE INVENTION

The invention concerns a method of forming a transparent, one-piece, single layer timepiece component including a top surface and a bottom surface connected by an edge, said edge extending in the thickness of said component.

The invention also concerns the application of this method to the making of a timepiece component.

The invention also concerns a timepiece movement including at least one component made according to this method.

The invention also concerns a timepiece including at least one component made according to this method.

The invention also concerns a so-called "mystery" timepiece including at least one plate made according to this method.

BACKGROUND OF THE INVENTION

The substitution of transparent components of mineral origin with transparent components made of moulded plastic material provides a functional alternative at low production cost, and complete independence from certain supply sources of up-market transparent materials.

However, moulded transparent parts are, on the one hand, relatively thick since it is difficult to mould very thin parts with adequate reproducible quality. On the other hand, the wear resistance, and particularly scratch resistance of these known plastic materials is very mediocre. The use thereof for the external components of timepieces—the middle part of the case, bezel or crystal—is thus limited in time.

This low wear resistance also makes it impossible to produce components with sharp angles, which would become blunt too quickly over time on contact with the user, his clothes, and ordinary everyday objects.

EP Patent Application No 0320811A1 in the name of ETA describes a method of making a solid mould for parts of very small dimensions, with shells derived from powder preforms transformed by sintering.

JP Patent Application No 58080587A in the name of SUWA SEIKOSHA describes an improvement to watch cases, in terms of resistance and dimensional precision, by the use of fibre glass treated with acrylic silane and mixed with a synthetic UV hardening resin, such as spirane resin, with a photo-polymerisation initiator agent such as benzophenone. These watch cases are moulded in elastic synthetic rubber or silicon moulds, which are fixed to glass plates and then UV-exposed for 30 seconds to 30 minutes depending on the intensity of radiation.

CH Patent Application No 369407A in the name of LONZA describes the employment of a mixture of polymethylmethacrylate and polyglycol dimethacrylate for manufacturing watch crystals or optical glasses.

EP Patent Application No 0549978A1 in the name of ETA describes a method of assembling a crystal on a watch case made of heat weldable thermoplastic material, with mechanical indexing between the crystal and the case.

US Patent Application No 2004/0241049A1 in the name of Bruce CARVALHO describes the employment of flexible elastomer tools for producing thermoplastic components.

WO Patent Application No 2012/025291A2 in the name of ETA SA describes the employment of silicon based polymers for making amorphous ceramics using a pyrolysis process.

SUMMARY OF THE INVENTION

The invention proposes to implement a method for obtaining, in an economical manner and with high dimensional precision, transparent one-piece timepiece components.

More particularly, it is an object of the invention to produce a component of this type, with a higher surface hardness than that of the timepiece components usually obtained by moulding plastic materials.

A particular object is also to make external timepiece parts, which include sharp angles, for example with a facet cut or diamond cut, and are resistant to wear.

The invention therefore concerns a method of forming a transparent one-piece, single layer timepiece component including a top surface and a bottom surface connected by an edge, said edge extending in the thickness of said component, wherein:
 a first transparent, polymerisable moulding material is selected for making said component, said first material including, as a proportion of the total:
 a mixture of trimethylolpropane tri (methacrylate) and pentaerythrityl tetraacrylate: 50-97.5%
 bis (4-tert-butylcyclohexyl) peroxydicarbonate: 0.5-1.5%
 1-benzoylcyclohexanol: 0.7-2.3%
 at least one additive 0-50%;
 polymethylsiloxane is selected as the second moulding material, to make a flexible mould for moulding said first moulding material and to allow the removal thereof from the mould;
 a plate is made whose contact surface is the negative of said top surface;
 a flexible female mould is made in said second moulding material, said female mould including:
  a first contact surface forming a female mould of said bottom surface;
  around said first contact surface, an edge including a first bearing surface arranged for cooperating in a complementary manner with said contact surface of said plate;
  and a second bearing surface opposite said first surface;
 an injection and degassing capillary network is made in said female mould;
 said second bearing surface of said female mould is applied to a support plate;
 at a distance from said first surface corresponding to the thickness required for said component, and exactly positioned in relation to said first surface, said plate is positioned with its said contact surface facing said first contact surface of said female mould, with said first bearing surface in sealed contact with said contact surface of said plate;
 said first moulding material is injected through said injection capillary network, so as to completely fill with said first moulding material a cavity delimited by said contact surface of said plate, said first contact surface of said female mould and said edge in sealed abutment via said first bearing surface thereof on said contact surface;

said first material injected into said cavity is left to polymerise until one said rigid component is obtained;

said plate and said support plate are moved away;

said component is removed from said flexible female mould by the deformation of said mould.

According to a feature of the invention, said first material is selected in a model composition wherein said first material includes, as a proportion of the total:

trimethylolpropane tri (methacrylate): 78.0%;
pentaerythrityl tetraacrylate: 19.5%;
bis (4-tert-butylcyclohexyl) peroxydicarbonate: 0.5%;
1-benzoylcyclohexanol: 2.0%.

According to a feature of the invention, said first material, injected into said cavity, is subjected during polymerisation to a temperature comprised between 100° C. and 120° C. for 10 to 20 seconds.

According to another feature of the invention, said ultraviolet ray transparent plate is made, and after injection of said first moulding material, said component is exposed by ultraviolet radiation, either through said transparent plate, or after extraction of said polymerised component from said cavity, to obtain improved hardness of said rigid component.

According to another feature of the invention, said second moulding material is chosen to be ultraviolet transparent so as to obtain a said flexible female mould which is ultraviolet transparent, and said support plate is chosen to be ultraviolet transparent, so as to expose to ultraviolet radiation said first material injected into said cavity, through said support plate and said flexible female mould, in addition to said exposition through said transparent plate, to obtain improved hardness of said rigid component.

According to another feature of the invention, a tightening force is applied to said plate and to said support plate during the injection of said first moulding material into said cavity, and during polymerisation of said first moulding material to form said component.

The invention further concerns the application of this method to the making of a timepiece component selected from among: a crystal, crown, middle part of the case, plate, bridge, wheel, escape wheel, pallets, oscillating weight.

BRIEF DESCRIPTION OF THE DRAWINGS

Other features and advantages of the invention will appear more clearly upon reading the following detailed description, with reference to the annexed drawings, in which.

DETAILED DESCRIPTION OF PREFERRED EMBODIMENTS

Figure 1:
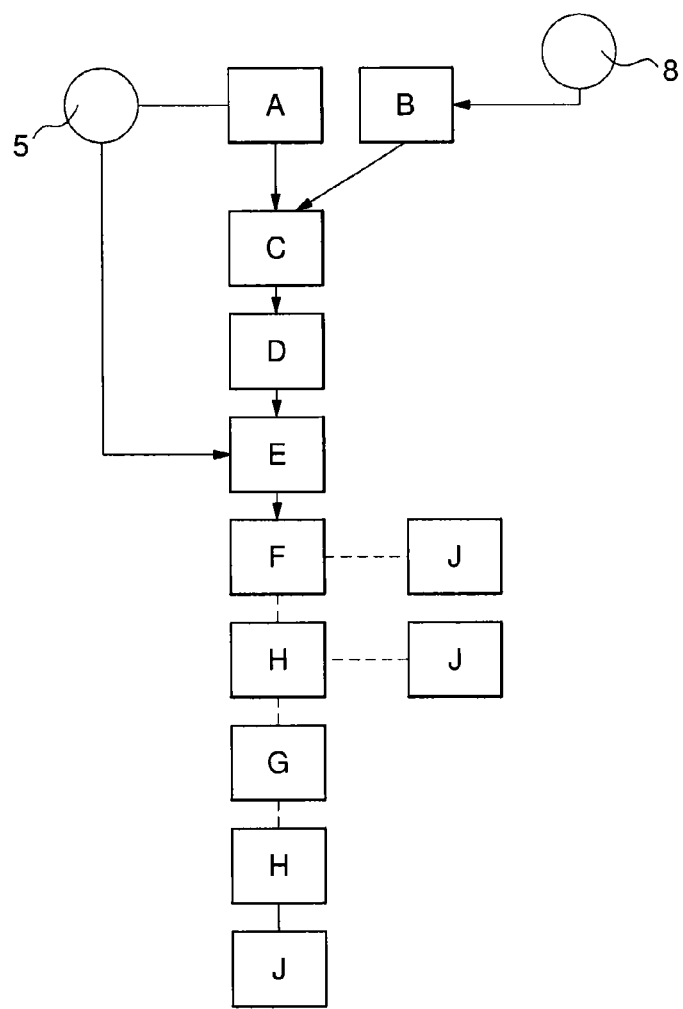
FIG. 1 shows a schematic flow chart of the series of operations for implementation of the method.

The invention concerns a method of forming a transparent timepiece component 1 including top 2 and bottom 3 surfaces connected by an edge 4, the edge 4 extending in the thickness of component 1.

The first step of the method consists in selecting a first moulding material 5.

Generally, this first material 5 includes at least acrylic monomers, at least one thermal initiator, at least one UV initiator and at least one cross-linking agent which may be formed by at least one of the acrylic monomers. It may also include one or more additives, which will be detailed below.

More specifically, this first material 5 includes a mixture of acrylic monomers including at least one monomer having a functionality greater than or equal to 2, at least one thermal initiator, and and at least one photochemical initiator. Here too, the material may include one or more additives.

Even more specifically, this first material 5 includes, as a proportion of the total:

a mixture of acrylic monomers having a functionality greater than or equal to 2: 50-97.5%
at least one thermal initiator: 0.5-3%
at least one photochemical initiator: 0.5-3%
at least one additive: 0-50%.

In an even more specific composition, this first material 5 includes, as a proportion of the total:

a mixture of trimethylolpropane tri (methacrylate) and pentaerythrityl tetraacrylate: 50-97.5%
bis (4-tert-butylcyclohexyl) peroxydicarbonate: 0.5-1.5%
1-benzoylcyclohexanol: 0.7-2.3%
at least one additive: 0-50%.

In a preferred composition, which will be referred to hereinafter as model composition CT of first material 5, this first material 5 includes, as a proportion of the total:

trimethylolpropane tri (methacrylate): 78.0%
pentaerythrityl tetraacrylate: 19.5%;
bis (4-tert-butylcyclohexyl) peroxydicarbonate: 0.5%
1-benzoylcyclohexanol: 2.0%

As regards those compositions of first material 5 which include additives, which are within a range of 0-50% of the total of first material 5, these additives may include, as a percentage of the total of said first material:

a. Antistatics:
  a. Copolymer polyamide-polyether: 0-15% preferably from 10-15%
  b. Ethylenic ionomer resin: 0-30% preferably from 10-30%
  c. Trineoalkoxy Zirconate: 0-30% preferably from 10-30%
b. Conductors:
  a. Conductive nanoparticles: gold, carbon nanotubes, silver, antimony tin oxide alloy, zinc aluminium oxide alloy, indium tin oxide alloy, zinc gallium oxide alloy: 0-30% preferably from 10-30%
c. Magnetics:
  a. Magnetic nanoparticles: magnetite: 0-30% preferably from 5-30%
d. Antibacterials
  a. Silver ions: 0-30% preferably from 10-30%
e. Anti-UV:
  a. Absorbers: benzotriazole: 0-0.2% preferably from 0.05-0.2%
  b. HALS (Hindered Amine Light Stabilizers): 0-0.02% preferably from 0.05-0.2%
f. Antioxidants:

a. Phenolic phosphite; ethylene bis [3,3-bis (3-tert-butyl-4-hydroxyphenyl) butyrate]; pentaerythritol tetrakis (3-(3,5-di-tert-butyl-4-hydroxyphenyl) propionate): 0-1.5% g. Fire retardants:
a. Phosphorus derivative: triphenyl phosphate 0-15%
b. Exfoliated montmorillonite: 0-15%
c. Clay nanotubes: 0-15% h. Lubricants:
a. Silicone acrylate: 0-2% preferably from 0.5-2% i. Colorants:
a. Anthraquinones: 0-50%
b. Azoics: 0-50% j. Pigments: 0-50% k. Adjuvants withr controlled delivery: incorporated in the formulation, these adjuvants are gradually released into the operating environment: 0-50% l. Microcapsules of repair agent, formed of polymerisable liquid of the same nature as the composition concerned, in particular in a model composition CT, the content then being integrated in the total content: 0-50%

To implement this method the following steps are carried out:

A: A transparent, polymerisable material 5 is selected for forming component 1 preferably of the model composition CT or "Cover Form®" material by Evonik®; this first transparent, polymerisable, moulding material 5 may also be chosen for making component 1, from among the acrylic polymer family or Nanocryl® by Hanse Chemie®

B: A flexible female mould 9 is made, a contact surface 10 of which is the negative of bottom surface 3, bordered by an edge 11, said mould 9 including a capillary network 14:

C: Flexible female mould 9 having a contact surface 10 which is the negative of bottom surface 3, bordered by an edge 11 is applied to a support plate 15, said mould 9 including a capillary network 14;

D: A cavity 17 is delimited by the sealed juxtaposition of edge 11 with a plate 6 having a contact surface 7 which is the negative of top surface 2;

E: Material 5 is injected through capillary network 14 to fill cavity 17;

F: Material 5 is polymerised to obtain a rigid component 1;

G: Component 1 is detached from the plates and from flexible mould 9 by the deformation of said mould.

Hardness is improved by the UV exposition of component 1. The preferred implementation of the invention includes this UV exposition allowing the photochemical initiator to be actuated in order to react, otherwise the mechanical properties of the finished component 1 are weaker.

Preferably, for implementation of the invention, either first material 5 is chosen to be the model composition CT which includes, as a proportion of the total:
trimethylolpropane tri (methacrylate): 78.0%
pentaerythrityl tetraacrylate: 19.5%
bis (4-tert-butylcyclohexyl) peroxydicarbonate: 0.5%
1-benzoylcyclohexanol: 2.0%;
or the Cover Form® material by Evonik Röhm® is chosen as first polymerisable, moulding material 5 for making component 1. This material is derived from the combination of two components: a liquid reactive referenced 30A and a liquid initiator referenced 30B.

This operating mode will be detailed below.

Preferably, to make a very precise female mould 9, a precision model matching the male profile of bottom surface 3 is made in a material such as SU8® or similar, and a flexible female mould 9 is made with this precision model of the second moulding material 8. This second moulding material 8 for making a flexible mould to mould first moulding material 5 and to allow the removal thereof from the mould, is chosen from among PDMS® or polymethylsiloxane.

Female mould 9 preferably includes:
a first contact surface 10 forming a female mould of bottom surface 3;
around first contact surface 10, an edge 11 including a first bearing surface 12 arranged to cooperate in a complementary manner with contact surface 7 of plate 6;
and a second bearing surface 13 opposite first surface 10.

An injection and degassing capillary network 14 is made in female mould 9;

The second bearing surface 13 of female mould 9 is preferably applied to a support plate 15. To facilitate automation, this support plate 15 is preferably rigid. When the plate is chosen to be transparent in an advantageous variant of the invention, it may be made of glass or similar.

A plate 6 is made having a contact surface 7 which is the negative of top surface 2; this plate 6 is formed of a material facilitating the separation of component 1 once polymerised. To facilitate automation of the method, plate 6 is advantageously rigid. When the plate is chosen to be transparent in an advantageous variant of the invention, it may be made of glass or similar. Naturally, it may also be made of the same second moulding material 8 and then be added to a support plate which is not shown in the Figures.

At a distance from first surface 10 corresponding to the thickness required for component 1, and exactly positioned in relation to first surface 10, plate 6 is positioned using centring, locating or similar agents, with its contact surface 7 facing first contact surface 10 of female mould 9, with the first bearing surface 12 in sealed contact with contact surface 7 of plate 6.

The first moulding material 5 is injected through injection capillary network 14, so as to completely fill with first moulding material 5 a cavity 17 delimited by contact surface 7 of plate 6, first contact surface 10 of female mould 9 and edge 11 in sealed abutment via its first bearing surface 12 on contact surface 7. Care is taken to completely degas cavity 17 so that no air bubbles remain.

The first material 5 injected into cavity 17 is left to polymerise until a rigid component 1 is obtained. This natural polymerisation may be accompanied by heating H, and/or ultraviolet ray (hereinafter "UV") exposition J, which each have the effect of increasing the surface hardness of the component 1 obtained, by permanently cross-linking the system. Exposition provides significant additional hardness, of around 10% compared to the same component polymerised at ambient temperature, or polymerised with heating, and in this latter case, for a surface hardness that is already higher than that of the same component polymerised at ambient temperature.

After polymerisation, plate 6 and support plate 15 are moved away. It is clear that it is possible to carry out a complementary heating and/or exposition both when component 1 is confined inside cavity 17 defined by the moulding equipment, or when it is removed therefrom. The duration of an injection and polymerisation cycle with heating is brief, around 30 to 40 seconds. The exposition cycle has a duration of 10 to 20 seconds.

In a preferred embodiment, polymerisation heating is performed when component 1 is still in the mould, the choice of exposition in or out of the moulding equipment essentially depends on the constraints of the production cycle: in one case the moulding equipment is immobilised slightly longer prior to shaping the following component, in the other case additional handling is required. In this case, first material 5 injected into cavity 17 is subjected during polymerisation to a temperature of less than 150° C., close to 110° C., particularly comprised between 100° C. and 120° C. for 10 to 20 seconds.

In an advantageous variant, cooling to ambient temperature is carried out at least as abruptly as heating, for a duration of less than 20 seconds.

Component 1 is easily detached from flexible female mould 9 simply by deforming the latter.

Advantageously, to further improve the surface hardness of component 1 obtained by implementing the method, the component is exposed to UV radiation.

Figure 3:
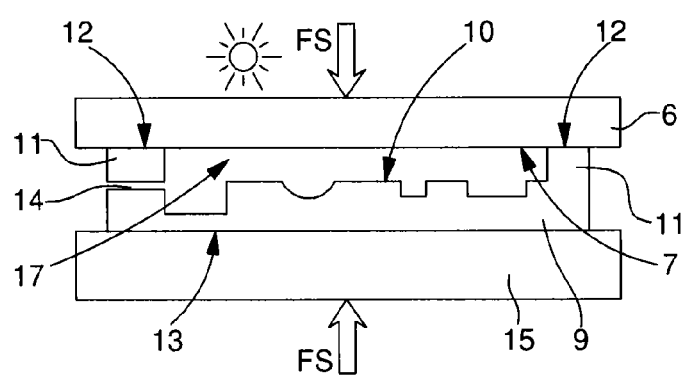
FIG. 3 shows, in a similar manner to FIG. 2, a second variant wherein the component is exposed through one piece of the equipment.

For this purpose, in a second variant, as seen in FIG. 3:
plate 6 is made transparent to UV radiation;
after injection of first moulding material 5, component 1 is exposed to UV radiation, either through transparent plate 6, or after the removal of component 1 polymerised in cavity 17, to obtain improved hardness of rigid component 1.

In a similar and advantageous manner, to further improve the surface hardness of component 1 obtained by implementing the method, all the surfaces of the component are exposed to UV radiation.

Figure 4:
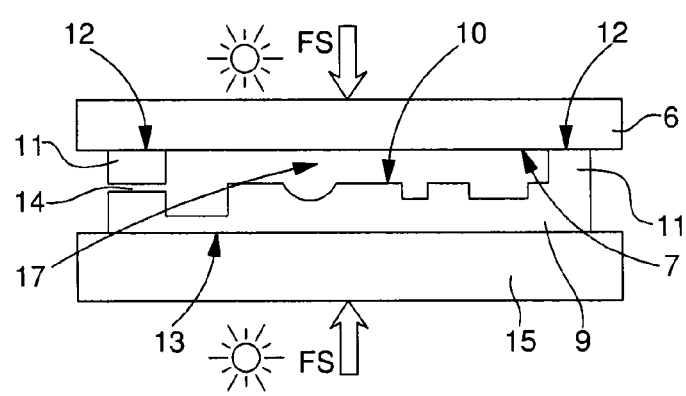
FIG. 4 shows, in a similar manner to FIG. 2, a variant wherein the component is exposed through several pieces of equipment.
Figure 5:
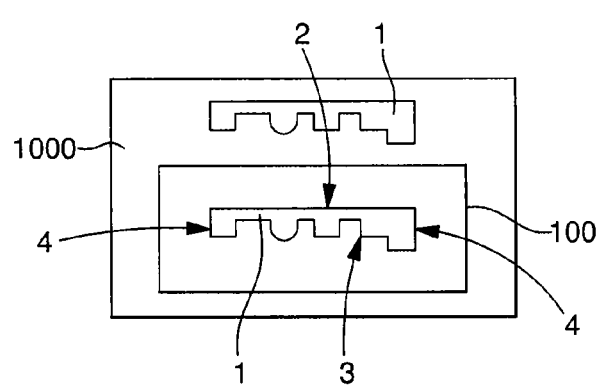
FIG. 5 shows block diagrams of a timepiece including at least one component made according to the invention.

For this purpose, in a third variant, as seen in FIG. 4:
the second moulding material 8 is selected to be UV transparent so as to obtain a UV transparent flexible female mould 9, and support plate 15 is selected to be UV transparent, so as to expose component 1 to UV radiation, in addition to the exposition through transparent plate 6, first material 5 injected into cavity 17, through the support plate 15 and flexible female mould 9, to obtain improved hardness of rigid component 1.

With the choice of materials proposed here, given the properties of great fluidity, in the non-polymerised state, of first material 5 formed of model composition CT or of the Cover Form® product, it is unnecessary to perform high pressure injection, since the wetability of the material is sufficient to enable it to perfectly and precisely occupy the whole of cavity 17, provided of course that capillary network 14 is properly formed to ensure complete degassing and the absence of any air bubbles. The first moulding material 5 can therefore be injected at a pressure of less than 150 MPa, and in particular at low pressure, notably less than 10 MPa.

In an advantageous variant implementation, a tightening force FS is applied to plate 6 and to support plate 15 during the injection of first moulding material 5 into cavity 17 and during polymerisation of first moulding material 15 to produce component 1.

In a particular embodiment, when component 1 has a plane top surface 2, plate 6 is made with at least its contact surface 7 plane, and flexible female mould 9 is made with its edge 11 having a first plane bearing surface 12.

Figure 6:
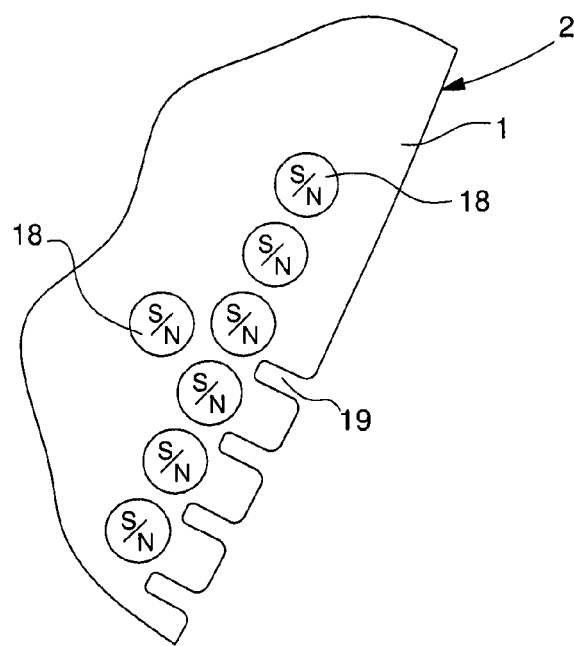
FIG. 6 shows a cross-section in proximity to the top surface of a component made according to a particular variant of the invention.
Figure 2:
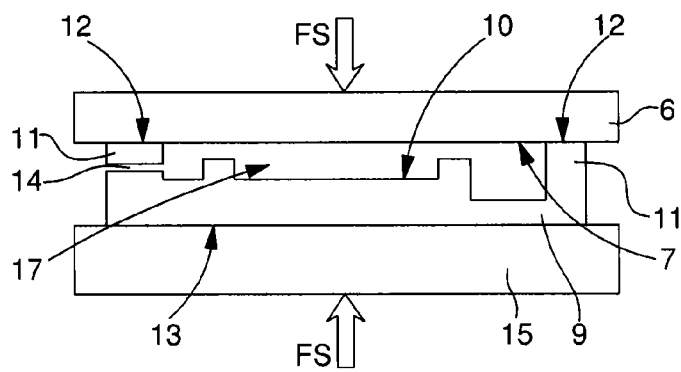
FIG. 2 shows a schematic cross-section through the thickness of the component to be formed substantially perpendicular to its main surfaces, the moulding equipment in the configuration thereof during shaping of the component, in a first variant without exposition through said equipment.

FIG. 6 illustrates a particular embodiment, wherein there is inserted into cavity 17 forming the mould, either prior to the injection of first moulding material 5, or during or after said injection, nodules 18 each including a electrifiable and/or magnetisable and/or electrified and/or magnetised core, particularly of the electret, ferrite, neodymium magnet type or similar. Electrification or magnetisation may be pre or post injection. FIG. 6 illustrates, for example, particles magnetised after the complete polymerisation of first moulding material 5, particularly of first material 5 formed of model composition CT or Cover Form® FIG. 6 also illustrates, in one area of top surface 2, cavities 19 arranged for lubrication. Contact surface 7 of plate 6 is then arranged accordingly.

In another variant, a lubricant material is mixed with first moulding material 5, in a similar manner to nodules 18 above.

The invention further concerns the application of this method to the making of a timepiece component 1 selected from among: a crystal, crown, middle part of the case, main plate, bridge, wheel, escape wheel, pallets, oscillating weight, bearing housing, shock absorber, although this list is not exhaustive.

The choice of first material 5 is the deciding factor for the resistance of the component 1 concerned. Indeed, some materials are specifically devised for surface coatings, but with a thickness of less than 50 µm, it is not always possible to apply these materials to the making of complete timepiece components. The preferred choice of first material 5 for use, formed of model composition CT or of Cover Form® in a range of thickness which can be much greater, notably several millimeters for watch crystals, is not self-evident and results from a long series of tests. Naturally, shrinkage is significant with these thicknesses, and the associated moulds must be sized accordingly.

The invention also concerns a timepiece movement 100 including at least one component 1 made according to this method.

The invention also concerns a timepiece 1000 including at least one component 1 made according to this method, or at least one movement 100 according to any of claims 1 to 9.

In a particular embodiment, timepiece 1000 is a so-called "mystery" timepiece including at least one plate made according to this method.

In another particular embodiment, this timepiece 1000 includes a jewellery cut faceted bezel made according to this method.

The invention makes it possible to obtain components of greater transparency, having greater a surface than that of ordinary moulded plastic materials, and with a durable hardness. Scratch resistance is very good. By using as first moulding material 5 the first material 5 formed of model composition CT or the Cover Form® product, with heat treatment at less than 130° C. and UV hardening, a hardness is obtained which is rated 7H on the graphite pencil hardness scale, compared to a hardness of 2H for a standard PMMA treated with scratchproof coating, or to the HB hardness of a polyamide.

The component thereby formed is resistant to scratching by glass wool.

If high quality carefully implemented moulds are used, it is not necessary to polish the component after manufacture.

The invention claimed is:
1. A method for forming a timepiece component, the method comprising:
making a plate comprising a contact surface which is negative of a top surface of the timepiece component;
making a flexible female mould from polymethylsiloxane as a second moulding material, wherein the female mould comprises: a first contact surface forming a female mould of a bottom surface of the timepiece component, an edge comprising a first bearing surface arranged to cooperate in a complementary manner with the contact surface of the plate around the first contact surface, and a second bearing surface opposite to the first contact surface;

creating an injection and degassing capillary network in the female mould;

applying the second bearing surface of the female mould to a support plate;

positioning the plate with the contact surface of the plate facing the first contact surface of the female mould and with the first bearing surface in sealed contact with the contact surface of the plate at a distance from the first contact surface corresponding to a thickness required for the timepiece component and exactly positioned relative to the first contact surface of the female mould;

injecting a first moulding material through the injection capillary network so as to completely fill with the first moulding material a cavity delimited by the contact surface of the plate, the first contact surface of the female mould and the edge in sealed abutment via the first bearing surface thereof on the contact surface of the plate;

polymerizing the first moulding material injected into the cavity to obtain a rigid timepiece component;

removing the plate and the support plate; and removing the timepiece component from the female mould by deforming the female mould, wherein:

the timepiece component is a transparent, one-piece, and single layer component and comprises the top surface and the bottom surface connected by an edge extending in a thickness direction of the timepiece component, and the first moulding material is a transparent material and comprises, based on a total amount of the first moulding material: 50-97.5% of a mixture of trimethylolpropane tri(methacrylate) and pentaerythrityl tetraacrylate, 0.5-1.5% of bis (4-tert-butylcyclohexyl) peroxydicarbonate, 0.7-2.3% of 1-benzoylcyclohexanol, and 0-50% of at least one additive.

2. The method according to claim 1, wherein the at least one additive is selected from the group consisting of:
10-15% of polyamide-polyether copolymer,
10-30% of an ethylenic ionomer resin,
10-30% of trineoalkoxy zirconate,
10-30% of at least one conductive nanoparticle selected from the group consisting of gold, a carbon nanotube, silver, an antimony tin oxide alloy, a zinc aluminium oxide alloy, an indium tin oxide alloy, and a zinc gallium oxide alloy,
5-30% of magnetic nanoparticles or magnetite,
10-30% of silver ions,
0.05-0.2% of benzotriazole,
0.05-0.2 of of hindered amine light stabilizers,
0-1.5% of an additive comprising phenolic phosphite; ethylene bis [3,3-bis (3-tert-butyl-4-hydroxyphenyl) butyrate]; pentaerythritol tetrakis (3-(3,5-di-tert-butyl-4-hydroxyphenyl) propionate),
0-15% of triphenyl phosphate,
0-15% of exfoliated montmorillonite,
0-15% of clay nanotubes,
0.5-2% of silicone acrylate,
0-50% of anthraquinones,
0-50% of azoics,
0-50% of pigments,
0-50% of adjuvants for controlled delivery, wherein the adjuvants are gradually released into an operating environment, and
0-50% of microcapsules of repair agent, wherein the microcapsules are formed of polymerisable liquid of the same nature as the microcapsules.

3. The method according to claim 1, wherein the first moulding material comprises:
78.0% of trimethylolpropane tri(methacrylate),
19.5% of pentaerythrityl tetraacrylate,
0.5% of bis (4-tert-butylcyclohexyl) peroxydicarbonate, and
2.0% of 1-benzoylcyclohexanol.

4. The method according to claim 1, wherein said polymerizing occurs at a temperature of from 100° C. to 120° C. for 10 to 20 seconds.

5. The method according to claim 1, wherein after said injecting, the timepiece component is exposed to UV radiation, either through the plate made in a UV transparent plate or after the timepiece component is removed from the female mould, to obtain improved hardness of the timepiece component.

6. The method according to claim 5, wherein the female mould is UV transparent in that the second moulding material is UV transparent and the support plate is UV transparent so that the timepiece component is exposed to the UV radiation through the support plate and the female mould in addition to exposition through the UV transparent plate to further improve the hardness of the timepiece component.

7. The method according to claim 1, wherein a tightening force is applied to the plate and to the support plate during said injecting and during said polymerizing.

8. The method according to claim 1, wherein
the top surface of the timepiece component is a plane surface,
the contact surface of the plate is a plane surface, and
the first bearing surface of the edge of the female mould is a plane surface.

9. The method according to claim 1, further comprising:
inserting nodules into the cavity before, during or after said injecting,
wherein
the nodules each comprise an electrifiable and/or magnetisable and/or electrified and/or magnetised core, and
electrification or magnetisation of the core occurs prior or subsequent to said injecting.

10. The method according to claim 1, wherein the timepiece component is a crystal, a crown, a middle part of a case, a plate, a bridge, an escape wheel, a pallet, an oscillating weight, a bearing housing, or a shock absorber.

* * * * *